United States Patent
Newsome et al.

(10) Patent No.: US 9,771,212 B1
(45) Date of Patent: Sep. 26, 2017

(54) METHOD AND APPARATUS FOR DISPENSING DRY PARTICULATE CONSUMABLES

(71) Applicants: Robert L. Newsome, Albany, GA (US); James Carter Parker, Port Allen, LA (US)

(72) Inventors: Robert L. Newsome, Albany, GA (US); James Carter Parker, Port Allen, LA (US)

( * ) Notice: Subject to any disclaimer, the term of this patent is extended or adjusted under 35 U.S.C. 154(b) by 205 days.

(21) Appl. No.: 14/881,990

(22) Filed: Oct. 13, 2015

Related U.S. Application Data (60) Provisional application No. 62/063,195, filed on Oct. 13, 2014.

(51) Int. Cl.
| | |
|---|---|
| *B65B 1/30* | (2006.01) |
| *B65D 88/26* | (2006.01) |
| *B65B 1/06* | (2006.01) |
| *B65G 65/00* | (2006.01) |
| *G06Q 20/18* | (2012.01) |

(52) U.S. Cl.
CPC ............... *B65D 88/26* (2013.01); *B65B 1/06* (2013.01); *B65G 65/005* (2013.01); *G06Q 20/18* (2013.01)

(58) Field of Classification Search
CPC ...... B65D 88/26; G06Q 20/18; B65G 65/005; B65B 1/06; B65B 1/08; B65B 1/10
See application file for complete search history.

(56) References Cited

U.S. PATENT DOCUMENTS

2005/0103398 A1\* 5/2005 Dalton ..................... B65B 1/08
141/83

\* cited by examiner

*Primary Examiner* — Jason K Niesz
(74) *Attorney, Agent, or Firm* — Allen, Dyer, Doppelt & Gilchrist (57) ABSTRACT

An apparatus for dispensing dry particulate consumables includes a storage silo to store the particulate consumables. A first end of a conveyor is adjacent to a discharge opening of the silo. A second end of the conveyor is in communication with a dispensing hopper. A motor is configured to drive the conveyor in order to fill the dispensing hopper, where the dispensing hopper is filled in response to a purchase signal indicating a purchase request for dispensing the particulate consumables. A user interface is configured to initiate the purchase signal, where the user interface is configured to receive payment from a purchaser for the particulate consumables. A controller is in communication with the user interface, the motor that controls the conveyor, and the dispenser hopper in order to control an amount of particulate consumables dispensed to the purchaser.

23 Claims, 7 Drawing Sheets

METHOD AND APPARATUS FOR DISPENSING DRY PARTICULATE CONSUMABLES

CROSS-REFERENCE TO RELATED APPLICATION

This application claims the benefit of U.S. Provisional Patent Application Ser. No. 62/063,195, filed on Oct. 13, 2014, the contents of which are herein incorporated by reference in their entirety.

FIELD OF THE INVENTION

The present disclosure is generally related to a method and apparatus for dispensing dry particulate consumables.

BACKGROUND OF THE INVENTION

In the United States there are a number of individuals that hunt deer and other wild game. It is a common practice of these hunters to place a feed source in the vicinity of the area to be hunted so as to have a more favorable chance of game passing through their field of vision. One method of providing a feeding attraction for the deer is the planting of food plots by the hunter. Such food plots are expensive in consideration of time and money while the hunter is reliant upon weather conditions for the success of the food plot. Furthermore, such food plots cannot always be placed at the optimum location for attracting the wild game and are not movable with changes in the travel patterns of the deer.

Another popular approach is the placing of purchased foods and attractants at desirable locations. The placement of concentrated attractants requires less effort and cost when compared to the food plot and are easily moved based on the travel patterns of the deer. Historically, there have been laws restricting the use of such attractants with regards to the time of year and location. In recent years these laws have been relaxed or eliminated due to the rapid growth of the deer population. Consequently, the use of attractant foods has increased in popularity. Hunters currently purchase bags of whole corn for their game attracting sites from commercial stores such as Wal-Mart, Tractor Supply, and True Value Hardware. Access to such suppliers is not always available when the hunter desires to make a purchase due to their operating hours and seasonal availability. Furthermore, the referenced vendors deliver the corn in fixed size disposable bags thereby increasing the unit cost.

A corollary problem exists for the "on-demand" vending of canine food for domestic as well as hunting dogs. Domestic keeping of canines is well established with a supply of canine food delivered through the same form of vendors as listed previously as well as grocery stores. The issues stated above with regard to accessibility and unit price are applicable and thereby restricting the purchaser of canine foods.

A corollary need for on-demand ice vending has produced a successful vending system of ice by unattended standalone systems. The availability of on-demand ice vending machines has grown widely in popularity and usage during the past decade. These ice vending machines are unique in that they only require water and electricity to produce ice and are continuously accessible to the customer. These vending systems typically fill a bag of ice on request and only require attention for bag replacement, removal of the tendered coins, and periodic maintenance.

In contrast to the on-demand ice vending, on-demand vending of particulate consumables, such as corn, will require a resupply system. The poultry growing industry has developed an economical and readily available feed supply system. Specifically, the raising of poultry as a food supply has led to the development of an industry for the storage, processing and delivery of feed corn to the poultry growhouses. These centralized systems are more economical due to storage and handling of the feed corn when compared to each of the grow-houses storing a year's supply of feed corn whether purchased or grown by the grow-house. The centralized feed corn distribution unit purchases the feed corn in bulk, processes, treats, and stores it for the delivery to the grow-houses. The delivery of the feed corn is accomplished using transport vehicles with integrated equipment for moving the feed corn into a storage bin located at the growhouse. The periodic delivery of the feed corn is scheduled per the requirement of the poultry as they grow.

Accordingly, there is a need for a reliable system for the economical "on-demand" delivery of dry particulate consumable such as attractant corn and canine food.

However, in view of the prior art at the time the present invention was made, it was not obvious to those of ordinary skill in the pertinent art how the identified needs could be fulfilled.

SUMMARY OF THE INVENTION

The present invention is directed to systems, apparatus and methods for the economical "on-demand" vending of dry particulate consumable such as corn and canine food.

In a particular illustrative embodiment of the method and apparatus for dispensing dry particulate consumables, the apparatus includes a storage silo to store the particulate consumables. The silo may have a sloping bottom for permitting the particulate consumables to gravitate towards a lowest part of the silo. A conveyor may be located proximate the lowest part of the sloping bottom of the silo, where a discharge opening in the silo is located adjacent to a first end of the conveyor. A second end of the conveyor is in communication with a dispensing hopper, where the hopper is sized to hold a pre-determined smaller volume of particulate consumables than that stored in the silo. A motor is provided for activating the conveyor in order to fill the dispensing hopper. The dispensing hopper may be filled only in response to a purchase signal indicating a purchase request for dispensing the particulate consumables. Alternatively, the dispensing hopper may be immediately refilled upon the dispensing hopper being emptied each time by a purchaser making a purchase request of the particulate consumables. The purchase signal may be initiated through the use of a user interface similar to a typical consumer vending machine, where the user interface is configured to receive payment from a purchaser for the particulate consumables. A controller is in communication with the user interface and the motor that controls the conveyor thereby controlling the quantity of particulate consumables delivered to the hopper. The apparatus may also include a bag dispenser that contains a plurality of bags that may be provided to the purchaser upon receiving a request for a bag using the user interface.

In order for the dispensing hopper to dispense the particulate consumables to the purchaser via a dispensing chute, the purchaser must satisfying pre-determined purchase requirements such as placing funds into the user interface through currency or using a debit or credit card, for example. The selected quantity of the particulate consumable is dispensed from the dispenser hopper into a bag or other suitable take away container upon verification of the receipt of payment.

The silo may be sized to contain over 20,000 pounds of shelled corn or other dry particulate consumable, which is connected to the conveyor such as a rotary auger that is capable of automatically delivering a premeasured load of corn to the hopper in a matter of seconds, for example. As described above, the particulate consumables may be stored in the dispensing hopper until the purchase request is made. The consumables are delivered by gravity flow from the dispensing hopper down the dispensing chute into the take away container. Though not required for on demand vending; one skilled in the art will recognize that the system performance is improved with the use of the dispensing hopper.

The silo will need to be replenished on a periodic basis that will be both location and seasonally sensitive. Accordingly, the silo may be replenished with the established poultry farm centralized delivery system that is readily available in order to provide a stable supply chain. In addition, a communication unit may be used to remotely transmit a status of the silo and other pertinent information as to the operation of the apparatus. For example, the information may include sales data, system performance, and status allowing scheduling of replenishing the silo as needed along with notification of maintenance requirements.

Other aspects, advantages, and features of the present disclosure will become apparent after review of the entire application, including the following sections: Brief Description of the Drawings and Detailed Description.

DETAILED DESCRIPTION OF PREFERRED EMBODIMENTS

A particular illustrative embodiment of an apparatus for dispensing dry particulate consumables is disclosed in FIGS. 1-9. A silo 100 is used to store dry particulate consumables, such as shelled corn, and may have a sloping bottom portion 102 for permitting the particulate consumables to gravitate towards a lowest part of the silo 100. A conveyor 104 may be located proximate the lowest part of the sloping bottom 102 of the silo 100, where a discharge opening in the silo 100 is located adjacent to a first end 106 of the conveyor 104. The conveyor 104 may be an auger type conveyor, air conveyor, or belt conveyor, for example. The conveyor 104 is configured to move the dry particulate consumables from the silo 100 to the dispensing hopper 108 as shown in FIGS. 1-6.

A second end of the conveyor 104 is in communication with the dispensing hopper 108, where the hopper 108 is sized to hold a pre-determined smaller volume of particular consumables than that stored in the silo 100. A motor 116 is provided for activating the conveyor 104 in order to fill the dispensing hopper 108. One skilled in the art will recognize that the volume to fill the dispensing hopper 108 can be a function of a running duration of a rotary valve, the conveyor 104, or through the use of level or weight sensors, for example.

Figure 1:
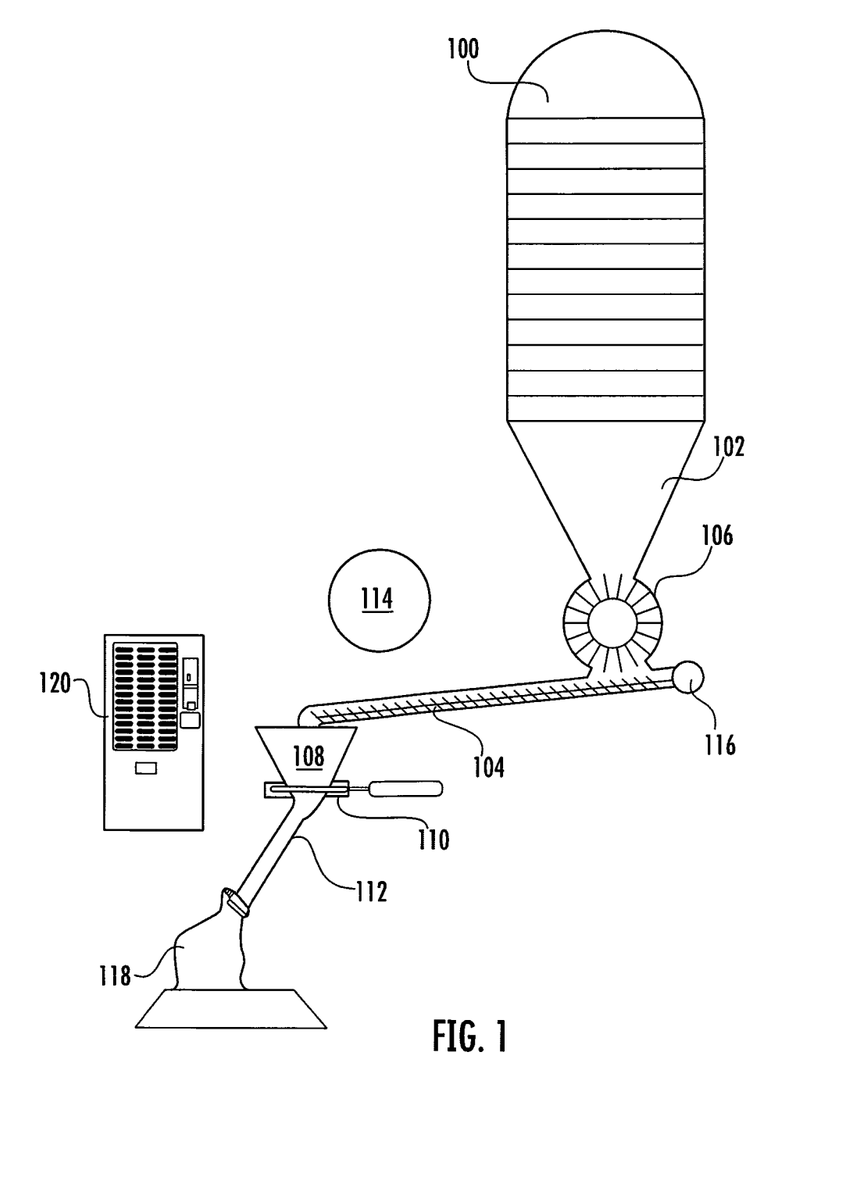
FIG. 1 is a functional diagram of the current invention.
Figure 2:
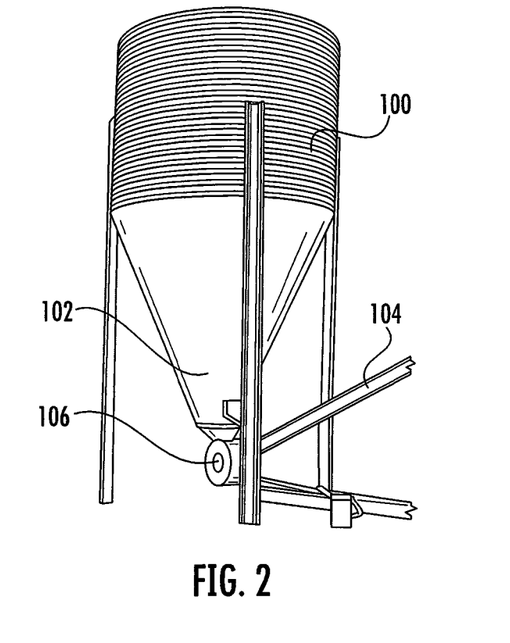
FIG. 2 is a perspective view of a particular illustrative embodiment of a silo of an apparatus for dispensing dry particulate consumables.
Figure 3:
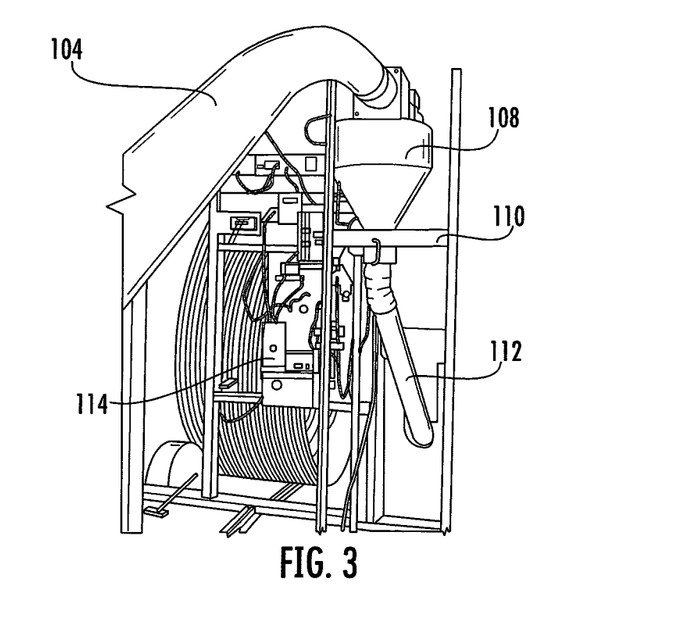
FIG. 3 is a perspective view of a conveyor and dispensing hopper of the apparatus for dispensing dry particulate consumables.
Figure 4:
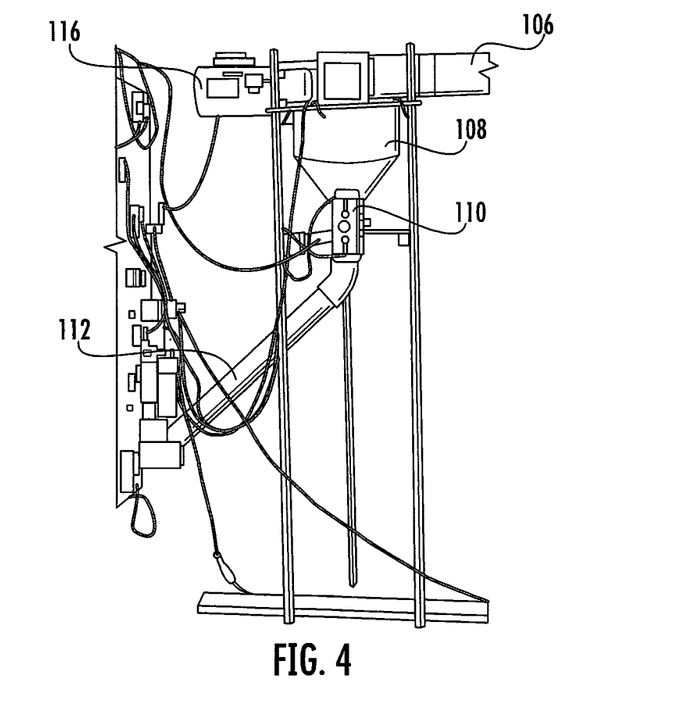
FIG. 4 is a side elevation view of the dispensing hopper and dispensing chute of the apparatus.
Figure 5:
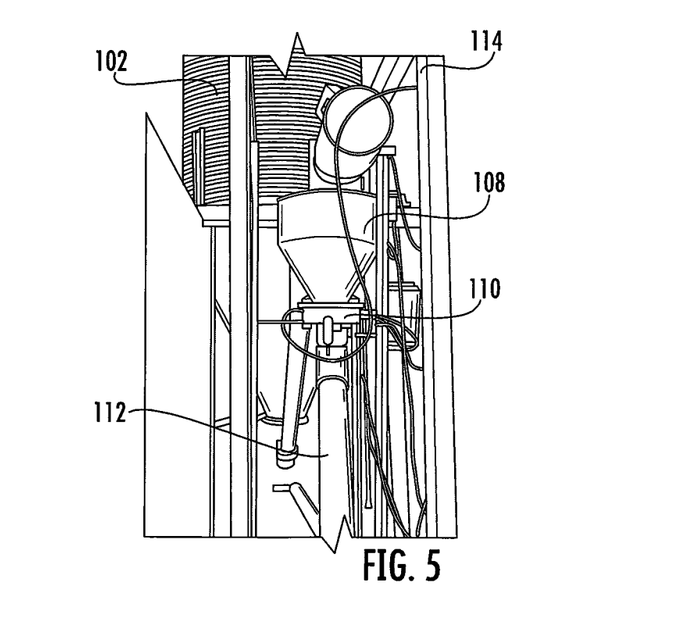
FIG. 5 is a front view of the dispensing hopper and dispensing chute shown in FIG. 3.
Figure 6:
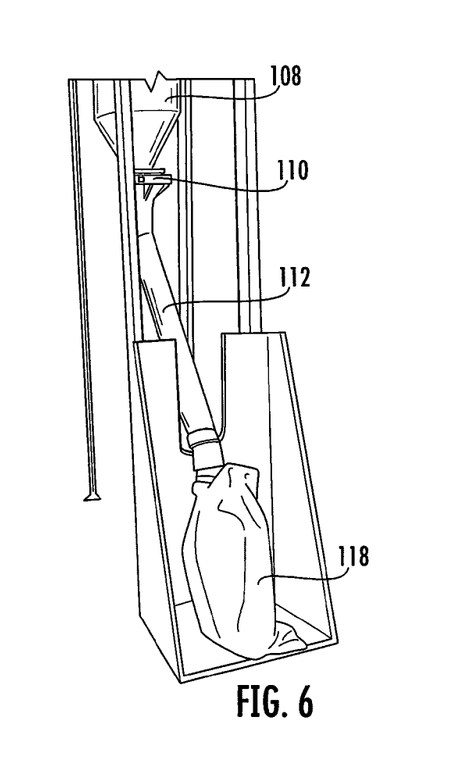
FIG. 6 is a perspective view of the dispensing chute and take away container of the apparatus for dispensing dry particulate consumables.
Figure 7:
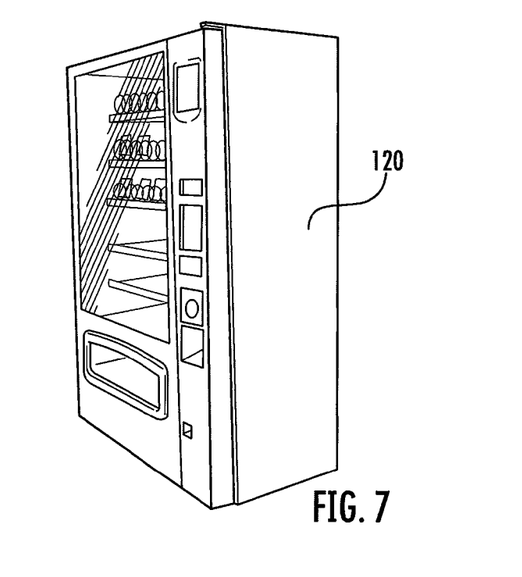
FIG. 7 is a perspective view of a user interface of the apparatus for dispensing dry particulate consumables.

The dispensing hopper 108 may be filled in response to a purchase signal indicating a purchase request for dispensing the particulate consumables, but at other times be empty. Alternatively, the dispensing hopper 108 may be immediately refilled upon the dispensing hopper 108 being emptied each time by a purchaser making a purchase request of the particulate consumables. A gate 110 is disposed at a bottom portion of the dispensing hopper 108 and is configured to move between a closed and open position to dispense the particulate consumables. The purchase signal may be initiated through the use of a user interface 120 similar to a typical consumer vending machine as shown in FIG. 7, where the user interface 120 is configured to receive payment from a purchaser for the particulate consumables.

A controller 114 is in communication with the user interface 120, the gate 110 and the motor 116 that controls the conveyor 104 thereby controlling the quantity of particulate consumables delivered to the dispensing hopper 108. In operation, the gate 110 at the bottom end of the dispensing hopper 108, which is in communication with the controller 114, moves to an open position in order to empty the contents of the dispensing hopper 108 to the dispensing chute 112.

The dispensing hopper 108 will dispense the particulate consumables to the purchaser via a dispensing chute 112, when the purchaser satisfies pre-determined purchase requirements such as placing funds into the user interface 120 through currency or using a debit or a credit card, for example. The selected quantity of the particulate consumable is dispensed from the dispenser chute 112 into a bag 118 or other suitable take away container upon verification of the receipt of payment.

The silo 100 may be sized to contain over 20,000 pounds of shelled corn or other dry particulate consumables, which is connected to the conveyor 104 such as a rotary auger capable of automatically delivering a premeasured load of corn to the hopper 108 in a matter of seconds, for example. As described above, the particulate consumables may be stored in the dispensing hopper 108 until the purchase request is made. The consumables are delivered by gravity flow from the dispensing hopper 108 down the dispensing chute 112 into the take away container 118 when the gate 110 is opened. The apparatus may also include a bag dispenser that contains a plurality of bags that may be provided to the purchaser upon receiving a request for a bag using the user interface 120.

The silo 100 will need to be replenished on a periodic basis that will be both location and seasonally sensitive.

Figure 11:
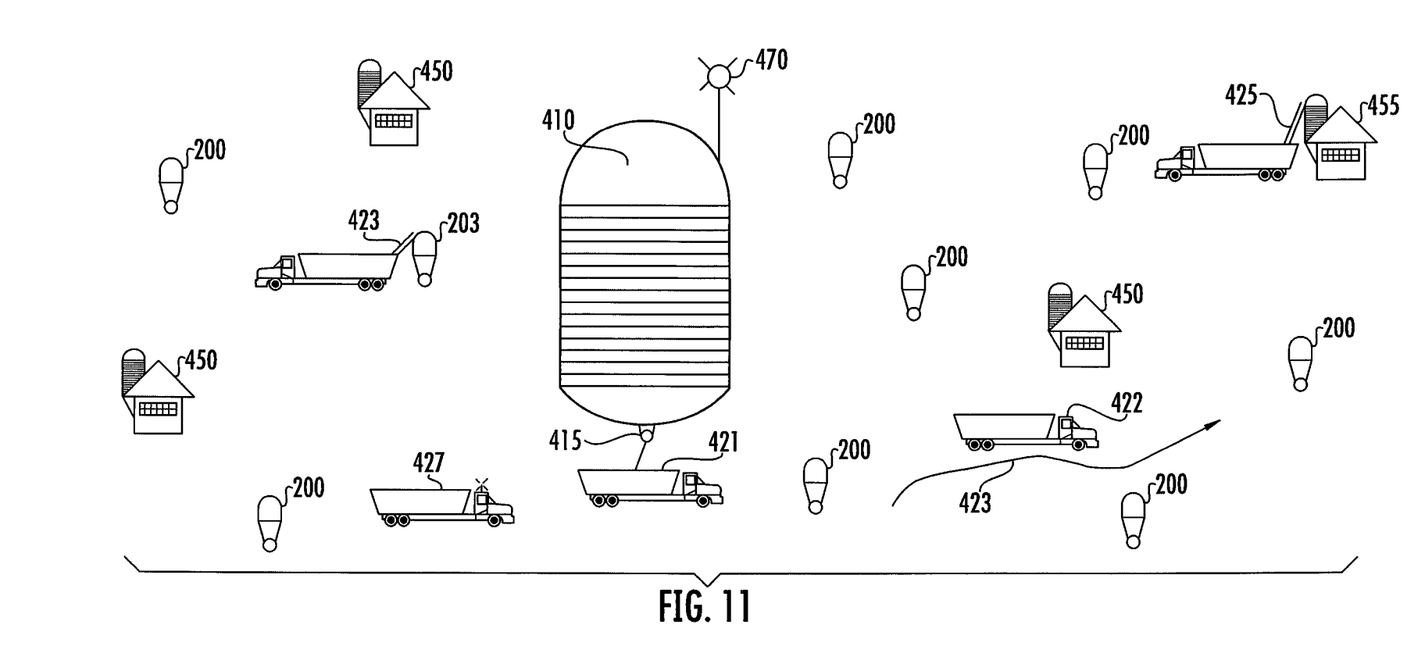
FIG. 11 is a diagram of the vending and supply network of the invention.

Accordingly, the silo 100 may be replenished using an established poultry farm centralized delivery system that is readily available in order to provide a stable supply chain of particulate consumables as shown in FIG. 11 In addition, a communication unit may be used to remotely transmit a status of the silo 100 and other pertinent information as to the operation of the apparatus. For example, the information may include sales data, system performance, and status allowing scheduling of replenishing the silo as needed along with notification of maintenance requirements.

Continuing with FIG. 11, a plurality of on-demand vending units 200 and poultry grow houses 450 are supplied by a central bulk corn supplier. The bulk corn supplier stores corn in a silo 410 equipped with a loading apparatus 415 for filling an empty delivery truck 421. A filled delivery truck 422 transports (shown as an arrow) the corn to a selected on-demand vending unit 203 and a selected poultry grow house 455. The filled delivery truck 422 is equipped for moving the corn from the filled delivery truck 422 to the selected on-demand vending site 203 shown as flow 423 or to the selected poultry grow house 455 shown as flow 425. In some embodiments a wireless delivery truck 427 is in radio communication 470 with the bulk corn supplier to more efficiently deliver the corn to the on-demand vending units 200 and the poultry grow houses 450.

Figure 8:
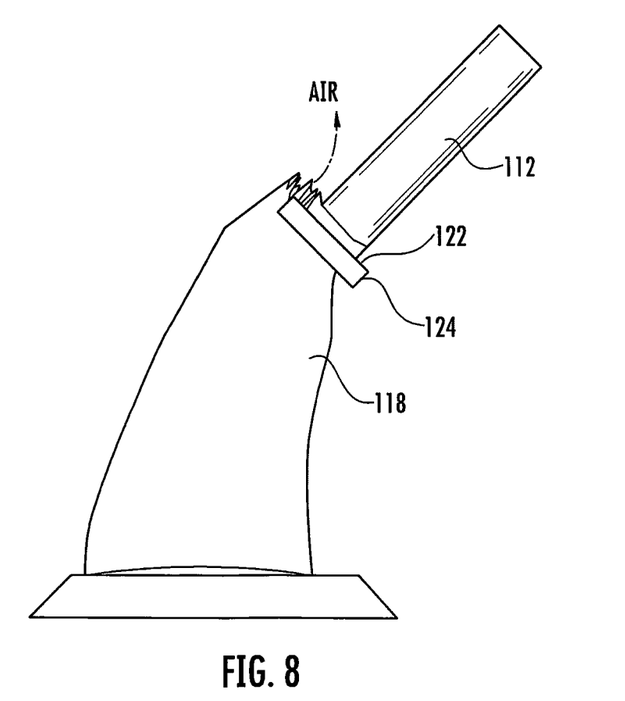
FIG. 8 is an elevation view of the dispensing chute and the take away container.
Figure 9:
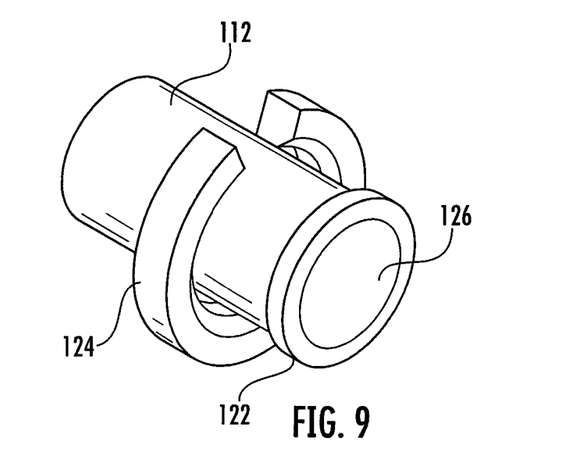
FIG. 9 is a partial perspective view of a split ring attachment to the dispensing chute.

Referring now to FIGS. 8 and 9, the dispensing chute 112 is secured to the take away container 118. A split ring 124 is configured to be fitted around an opening of the take away container 118, which is a bag in this example, and a neck 122 of the dispensing chute 112. The split ring 124 is configured so that as the particulate consumables are dispensed into the take away container 118 from an open end 126 of the dispensing chute 112, the displaced air can escape through a portion of the opening of the bag as shown in FIG. 8.

Figure 10:
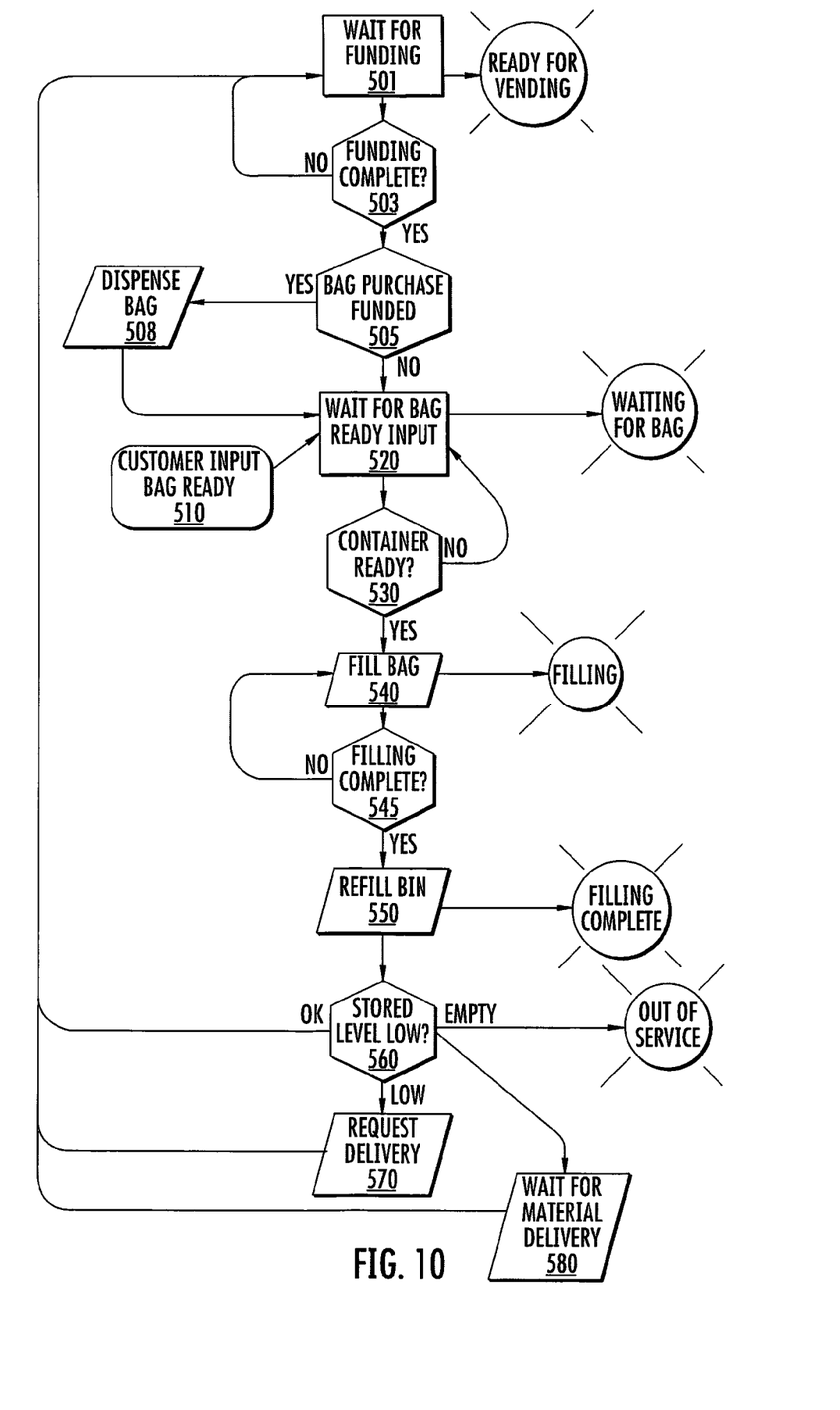
FIG. 10 is a flow diagram of a method for dispensing dry particulate consumables.

A flow diagram for dispensing dry particulate consumables is disclosed in FIG. 10. At 501, the system is ready and waiting for a purchase request and funding. Once the funding is completed, at 503, the system determines whether a bag is requested and funding for the bag has been completed, at 505. If a bag has been funded, then the bag, at 508, is dispensed to the purchaser. The system waits, at 520, until the purchaser has placed the bag ready to be filled, at 510. Once the system determines the bag is ready, at 530, the bag is filled with particulate consumables, at 540. After the bag is filled, at 545, then the dispenser hopper, at 550, is refilled. The system determines whether the particulate consumables need to be replenished, at 560, in the silo. If the silo is empty, then the system indicates that it is out of service and a delivery is requested, at 570. The system waits, at 580, until the silo is replenished before indicating that the system is ready to dispense more particulate consumables.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. An apparatus for dispensing dry particulate consumables, the apparatus comprising:
a silo for storing a first volume of the dry particulate consumables, the silo including a discharge opening in a lower portion thereof;
a dispensing hopper for storing a second volume of the dry particulate consumables, the second volume being smaller than the first volume, the dispensing hopper including an upper hopper end and a lower hopper end;
a conveyor operable to move the dry particular consumables between first and second conveyor ends, the first conveyor end configured to receive the dry particulate consumables from the discharge opening of the silo, the second conveyor end configured to deliver the dry particular consumables to the upper hopper end;
a user interface for receiving payment from a purchaser of the dry particulate consumables; and
a controller in communication with the user interface, the conveyor and the dispensing and configured to:
operate the dispensing hopper to dispense a predetermined amount of the dry particulate consumables to the purchaser from the lower hopper end upon receipt of payment therefor via the user interface; and
operate the conveyor to fill the dispensing hopper with the predetermined amount of the dry particulate consumables.

2. The apparatus of claim 1, wherein the dispensing hopper includes a gate disposed at the lower hopper end, the controller being configured to open and close the gate to dispense the predetermined amount of the dry particulate consumables to the purchaser.

3. The apparatus of claim 1, further comprising a dispensing chute extending from the lower hopper end to a take away container fill location.

4. The apparatus of claim 3, wherein a split ring is disposed around a neck of the dispensing chute, the split ring being configured for fitting around an opening of the take away container while allowing air to escape therethrough during dispensing of the predetermined amount of the dry particulate consumables.

5. The apparatus of claim 1, wherein the second volume is approximately equal to the predetermined amount of the dry particular consumables.

6. The apparatus of claim 1, further comprising a bag dispenser, the controller also communicating with the bag dispenser and configured to operate the bag dispenser to dispense a bag upon receiving payment therefor via the user interface.

7. The apparatus of claim 1, wherein the conveyor includes a conveyor motor, the controller being further configured to operate the conveyor motor.

8. The apparatus of claim 1, wherein the conveyor includes at least one of: an auger type conveyor, an air conveyor and a belt conveyor.

9. The apparatus of claim 1, wherein the controller is further configured to operate the conveyor to fill the dispensing hopper with the predetermined amount of the dry particulate consumables upon receipt of payment therefor via the user interface and prior to operating the dispensing hopper to dispense the predetermined amount of the dry particulate consumables to the purchaser.

10. The apparatus of claim 1, wherein the controller is further configured to automatically operate the conveyor to fill the dispensing hopper with the predetermined amount of the dry particulate consumables after operating the dispensing hopper to dispense the predetermined amount of the dry particulate consumables to the purchaser.

11. The apparatus of claim 1, wherein the controller is further configured to automatically operate the conveyor to fill the dispensing hopper with the predetermined amount of the dry particulate consumables based on at least one of: a conveyor running duration, a sensed weight of the dry particulate consumables and a sensed level of the dry particulate consumables.

12. The apparatus of claim 1, wherein the first conveyor end includes a rotary valve and the controller is further configured to automatically operate the conveyor to fill the dispensing hopper with the predetermined amount of the dry particulate consumables based on a rotary valve running time.

13. The apparatus of claim 1, wherein the controller is further configured to determine whether the first volume of the dry particulate consumables in the silo needs to be replenished.

14. The apparatus of claim 13, wherein the controller is further configured to request replenishment via a communications unit when replenishment of the first volume is determined to be needed.

15. The apparatus of claim 1, further comprising the first volume of the dry particulate consumables in the silo.

16. The apparatus of claim 15, wherein the dry particulate consumables include corn.

17. The apparatus of claim 15, wherein the dry particulate consumables include canine food.

18. A method of dispensing dry particulate consumables, the method comprising using an electronic controller in communication with a user interface, a dispensing hopper, a conveyor and a silo to:

receive, via the user interface, payment for a predetermined amount of the dry particulate consumables;
fill, via the conveyor, the dispensing hopper from the silo with the predetermined amount of the dry particulate consumables; and
dispensing the predetermined amount of the dry particulate consumables into a take away container upon receipt of the payment.

19. The method of claim 18, wherein the filling of the dispensing hopper from the silo occurs upon receipt of the payment prior to the dispensing.

20. The method of claim 18, wherein the filling of the dispensing hopper from the silo occurs automatically after the dispensing.

21. The method of claim 18, further comprising determining whether a take away container is ready to receive the dry particulate consumables prior to the dispensing.

22. The method of claim 18, further comprising:
receiving payment for a take away container via the user interface; and
dispensing the take away container upon receipt of the payment.

23. The method of claim 18, further comprising:
determining whether an amount of the dry particulate consumables remaining in the silo is low; and
requesting delivery of additional dry particulate consumables if the amount remaining is determined to be low.

* * * * *